UNITED STATES PATENT OFFICE.

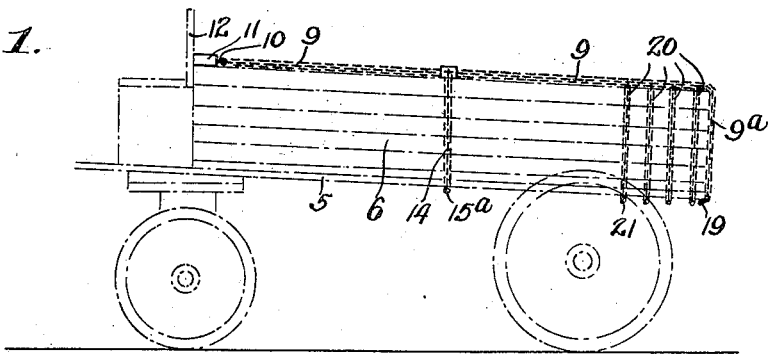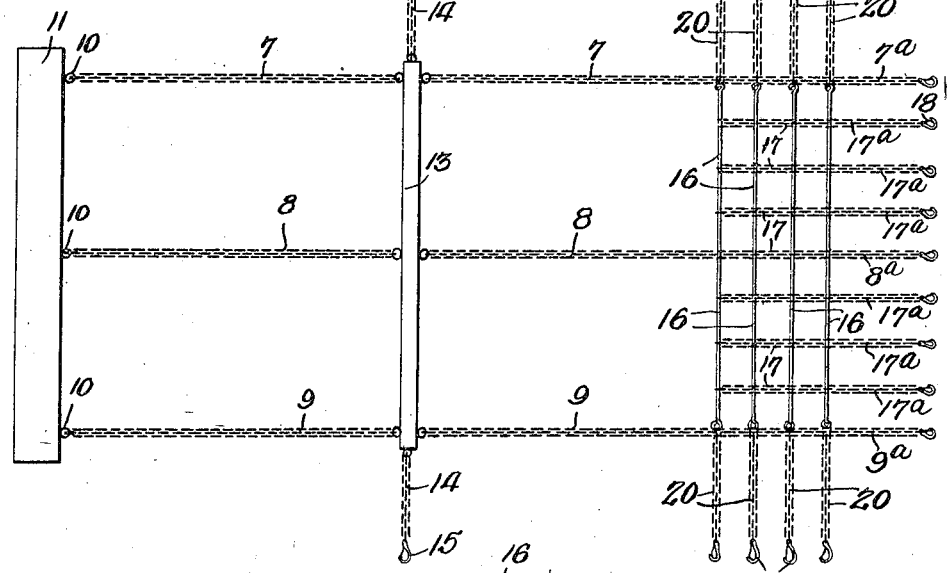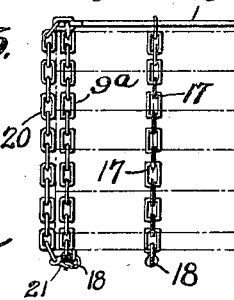

MARY E. SAUNDERS, OF PHILADELPHIA, PENNSYLVANIA.

LOAD-BINDER FOR VEHICLES.

1,375,183.   Specification of Letters Patent.   Patented Apr. 19, 1921.

Application filed September 14, 1920. Serial No. 410,149.

*To all whom it may concern:*

Be it known that I, MARY E. SAUNDERS, a citizen of the United States, residing at Philadelphia, in the county of Philadelphia and State of Pennsylvania, have invented certain new and useful Improvements in Load-Binders for Vehicles, of which the following is a specification.

One object of my invention is to provide an improved load binder which can be used in connection with trucks, drays, wagons or other vehicles for the purpose of securely binding the load thereon.

Another object is to make my improved load binder of a simple and durable construction which can be easily manipulated to bind a load of material on a vehicle and which can be easily detached when it is desired to remove the load of material.

These objects, and other advantageous ends which will be described hereinafter, I attain in the following manner, reference being had to the accompanying drawings in which—

Figure 1 is a side elevation illustrating my improved load binder in the position which it occupies when binding a load of material upon a vehicle; the vehicle and load of material being illustrated in dot-and-dash lines, Fig. 2 is a top plan view illustrating my improved load binder, Fig. 3 is a fragmentary rear end elevation showing certain of the parts of my invention in operative position, and Fig. 4 is an enlarged fragmentary plan view showing certain of the connections between the parts.

Referring to the drawings, 5 represents a vehicle having a load of material 6 thereon; the vehicle being of a type without a tail board and upon which the material can be stacked, such for example as lumber wagons; the load consisting of lumber piled in a superimposed condition.

As illustrated my invention consists of three longitudinally extending chains 7, 8 and 9 which are spaced apart in substantially parallel formation and at their forward ends are connected to eyelets 10 of a cross beam 11. The beam 11 may be attached in any suitable manner to the rear of a supporting structure such for example as the side 12 and the chains 7, 8 and 9 are adapted to extend over the top of the load 6. The chains 7, 8 and 9 are each interrupted in their length and a cross bar 13 is interposed between the sections of the chains; said cross bar at its opposite ends having two laterally extending chains 14 which are provided at their outer ends with hooks 15 which may be secured in staples or eyelets 15$^a$ secured under the body portion or floor of the vehicle; the chains 14 serving to extend in embracing position with the opposite sides of the load. Adjacent the rear ends of the chains 7, 8 and 9, I connect a number of transverse rods 16 which are spaced apart and are each flexibly connected to the chains 7, 8 and 9. Between the chains 7, 8 and 9 are located a number of comparatively short chains 17 which are flexibly connected to the rods 16 and have portions 17$^a$ projecting rearwardly of said rods. The portions 17$^a$ are provided with hooks 18 adapted to be attached to eyelets 19 under the floor of the vehicle and serve to embrace the rear end of the load. The chains 7, 8 and 9 are also continued beyond the rods 16 as shown at 7$^a$, 8$^a$ and 9$^a$ and these extensions are also provided with hooks for attachment to eyelets under the floor of the vehicle within the zone occupied by the transverse rods 16. I also provide laterally extending chains 20 which are provided with hooks 21 and are adapted to embrace the sides of the load adjacent the rear thereof. Thus a flexible housing is provided at the rear of the load binder for firmly supporting the rear of the load preventing lateral shifting movement and also longitudinal sliding movement of said load. The arrangement of the cross bar and transverse rods serves to keep the parts in properly spaced position both while in use and when removed from binding position since the parts can be readily rolled in the direction of the length of the chains 7, 8 and 9 and when not in use the device can be stored in a rolled or wrapped position. Furthermore the construction is such that if desired a part of the device including certain of the transverse rods can be turned over the rear end of the load so that certain of the rods will abut the rear end of the load and thereby assist in retaining the load upon the vehicle.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A load binder including longitudinally extending flexible members and transversely extending rods spaced apart, certain of said longitudinally extending members crossing said rods between their ends to provide a housing for embracing the rear end of a load upon a vehicle; substantially as described.

2. A load binder including members adapted to extend longitudinally over a load on a vehicle and having a housing at its rear end adapted to embrace the rear portion of a load, said housing including transversely extending members and longitudinally extending members, said transverse and latter mentioned longitudinally extending members being provided with means for connection with the bottom of the vehicle, said first mentioned longitudinally extending members including a transverse bar; and laterally extending flexible means connected to the opposite end portions of said bar and adapted to embrace the side portions of a load upon the vehicle, said laterally extending means having means for connection with the bottom of said vehicle; substantially as described.

In testimony whereof I have signed my name to this specification in the presence of two subscribing witnesses.

MARY E. SAUNDERS.

Witnesses:
 ELIZBETH GARBE,
 CHAS. E. POTTS.